United States Patent [19]

Eckstein

[11] Patent Number: 5,111,996
[45] Date of Patent: May 12, 1992

[54] INCREMENTAL PRESSURE-COMPENSATING DRIP IRRIGATION EMITTER

[75] Inventor: Gershon Eckstein, Fresno, Calif.

[73] Assignee: Drip Irrigation Systems, Ltd., Nicosia, Cyprus

[21] Appl. No.: 661,880

[22] Filed: Feb. 27, 1991

[51] Int. Cl.⁵ ............................................. B05B 1/30
[52] U.S. Cl. ............................. 239/542; 239/533.1; 239/547; 239/570; 137/110; 137/512.15; 251/127
[58] Field of Search .............. 239/542, 547, 271, 272, 239/570, 533.1; 137/110, 512.15; 251/120, 127; 138/40, 42

[56] References Cited

U.S. PATENT DOCUMENTS

| | | |
|---|---|---|
| 3,815,636 | 6/1974 | Menzel ................................. 239/542 |
| 3,998,244 | 12/1976 | Bentley . |
| 4,307,841 | 12/1981 | Mehoudar et al. . |
| 4,344,576 | 8/1982 | Smith . |
| 4,354,639 | 10/1982 | Delmer . |
| 4,382,549 | 5/1983 | Christy et al. . |
| 4,473,191 | 9/1984 | Chapin ................................. 239/542 |
| 4,506,423 | 3/1985 | Nakamura et al. ................. 251/126 |
| 4,600,152 | 7/1986 | Samueli . |
| 4,613,080 | 9/1986 | Benson et al. . |
| 4,653,695 | 3/1987 | Eckstein . |
| 4,687,143 | 8/1987 | Gorney et al. ...................... 239/542 |
| 4,817,666 | 4/1989 | Sanville . |
| 4,824,025 | 4/1989 | Miller ................................. 239/542 |
| 4,917,535 | 4/1990 | Prassas . |

FOREIGN PATENT DOCUMENTS

2625544  6/1989  France .

Primary Examiner—Andres Kashnikow
Assistant Examiner—Christopher G. Trainor
Attorney, Agent, or Firm—Edward B. Anderson

[57] ABSTRACT

An outer wall member, such as the wall of a tube, connectable to or integral with the pipe, has an opening in communication with the exterior of the pipe. An inner member is fixedly positioned against the inside of the outer member for separating the opening from the fluid path through the pipe. The inner member has an inner surface defining at least a portion of an inner chamber in communication with the pipe fluid path. The inner and outer members define a labyrinth having an effective cross-sectional area, an inlet end for receiving pressurized fluid from the pipe, and an outlet end in communication with the pipe opening for emitting fluid. A plurality of channels couple intermediate portions of the labyrinth directly to the opening, thereby bypassing respective parts of the labyrinth. A resilient wall, functioning as a valve, forms a barrier between the channel and the inner chamber and is responsive to the pressure in the inner chamber for restricting the channel when the pressure exceeds a first predetermined pressure. This prevents the fluid from bypassing part of the labyrinth, increases the effective length of the labyrinth, and thereby reduces the flow that takes place at the higher pressure.

12 Claims, 10 Drawing Sheets

INCREMENTAL PRESSURE-COMPENSATING DRIP IRRIGATION EMITTER

FIELD OF THE INVENTION

The present invention relates generally to emitters for drip irrigation systems, and more particularly, to such emitters that are pressure compensating to apply controlled water distribution to vegetation at relatively low rates of flow while automatically compensating for varying pressures in the water supply system. The amount of water emitted remains substantially constant despite fluctuations in the supplied water pressure.

BACKGROUND OF THE INVENTION

A drip irrigation system provides application of water to specific plant or root zone locations in controlled quantities. It is thereby possible to irrigate planted areas with substantially less water than is used by general broadcast sprinkler or flooding methods. However, if the same non-pressure-compensating emitter is used at all drip locations, those emitters in the irrigation system which are subject to higher water pressure release more water. There is thus uneven water distribution.

In order to overcome this problem, pressure-compensating emitters have been developed which allow a fairly uniform water flow over a range of water pressures within the irrigation system. This allows an irrigation system to be constructed having longer drip lines and fewer distribution or sub main lines. A substantial number of these use a deformable material, such as a resilient web, which restricts a flow path or distorts water outlets in order to limit flow rates.

Examples of these devices are described in Mehoudar et al. U.S. Pat. No. 4,307,841; Smith U.S. Pat. No. 4,344,576; and Delmer U.S. Pat. No. 4,354,639. Miller discloses in U.S. Pat. No. 4,824,025 an emitter having an internal transverse channel member that closes with increasing conduit fluid pressure. When the channel is restricted it is vulnerable to clogging. A more extensive list is given in my U.S. Pat. No. 4,653,695. A disadvantage of such devices is that the restricted flow path tends to become clogged due to sediment collecting in the restricted region. My patent discloses another type of pressure-compensating emitter that avoids this restriction-clogging problem. This emitter has a cylindrical member positioned in a sleeve, with a labyrinth formed between the cylinder and sleeve. A non-fluid-restricting chamber exists at one end of the cylinder so that the cylinder can slide in and out of the sleeve, and thereby vary the length of the labyrinth. The position of the cylinder is adjusted according to the water pressure, so that a longer labyrinth exists at higher pressures.

That emitter solved the problem of clogged passageways, since the passageway cross-sectional area is constant, but is relatively expensive to produce.

Other forms of emitters have also been developed. For instance, Bentley in U.S. Pat. No. 3,998,244 shows a drip emitter with a helical flow path that is manually adjustable in length. The flow path has dams that are resilient and deform in response to fluid at an inlet pressure to increase the resistance to flow.

Christy et al., in U.S. Pat. No. 4,382,549, discloses an emitter in which a flexible plate moves between a closed position and a higher pressure restricted-flow position. When the plate is in an intermediate position, water flows relatively unrestrictedly.

Samueli discloses in U.S. Pat. No. 4,600,152 an emitter in which flow is limited by intersecting flow paths. Further resistance to flow is provided by obstructions at the flow intersections. This emitter does not permit compensation for change in fluid pressure.

In Benson et al. U.S. Pat. No. 4,613,080, disclose an emitter that has various flow paths. The emitter is manually adjusted to control the number of flow paths. Once set, there is no compensation for changes in fluid pressure.

In the invention disclosed by Sanville in U.S. Pat. No. 4,817,666, a solenoid selectively opens and closes outlets. Flap valves are then responsive to pressure drop at a closed outlet to close an associated output. This is a complex and expensive form of valve.

Prassas, in U.S. Pat. No. 4,917,535 also discloses an externally adjustable emitter. A valve is manually adjustable for bypassing a restricted flow path to allow flushing the fluid outlet.

A similar device is disclosed by G. Rolland in French Pat. No. 2,625,544. At a low fluid pressure, a flexible disk allows relatively free flow of fluid over a barrier to an outlet. As pressure increases, the disk deforms, apparently restricting flow over the barrier. Ultimately flow over the barrier is stopped, but a turbulent flow path covered by the disk remains open.

Many of these prior art emitters are built with a low-pressure, free-flow feature, that allows them to be flushed out. In large irrigation systems this can require increasing the power of the pumping system to create a great enough flow to close the free-flow feature and thereby set all the emitters into a limited flow, pressurized system. This additional power makes the irrigation system more expensive.

There thus remains a need for a dynamically pressure-compensating emitter that maintains an unrestricted, fluid-flow-limiting passageway during all operating conditions and is relatively economical to produce

SUMMARY OF THE INVENTION

These features are provided in the present invention by an emitter having valves that are used to control the length of a fluid-flow-limiting passageway, such as a labyrinth, rather than the cross-sectional area of the passageway. Further, it is provided in an embodiment that is relatively inexpensive to make.

Generally, the invention provides a drip irrigation emitter for use with an irrigation pipe containing pressurized fluid. A labyrinth couples the interior of the pipe to the exterior of the pipe and has a maximum fluid-flow path length. A valve is coupled to the labyrinth, and is operable between a fluid-flow restricting state and a fluid-flow nonrestricting state. In response to the fluid pressure inside the pipe, the valve operates in one of the operating states when the pressure inside the pipe is less then a predetermined pressure and operates in the other of the operating states when the pressure inside the pipe is more than the predetermined pressure. When the valve is operating in the one state, the length of the path of fluid flowing through the labyrinth is less than the maximum length.

In one preferred embodiment of the invention, an outer wall member, such as the wall of a tube, connectable to or integral with the pipe, has an opening in communication with the exterior of the pipe. An inner member is fixedly positioned against the inside of the outer member for separating the opening from the fluid path through the pipe. The inner member has an inner surface defining at least a portion of an inner chamber in communication with the pipe fluid path. The inner and outer members define a labyrinth having an effective cross-sectional area, an inlet end for receiving pressurized fluid from the pipe, and an outlet end in communication with the pipe opening for emitting fluid.

A channel couples an intermediate portion of the labyrinth directly to the opening, thereby bypassing part of the labyrinth. A resilient wall, functioning as a valve, forms a barrier between the channel and the inner chamber and is responsive to the pressure in the inner chamber for restricting the channel when the pressure exceeds a first predetermined pressure. This prevents the fluid from bypassing part of the labyrinth, and thereby reduces the flow that would otherwise take place at the higher pressure.

It can be seen that such a structure is simple to manufacture and may be made of a unitary structure that may be mounted directly in the irrigation pipe. Many other variations are also possible. Although pressure compensation is achieved in incremental steps, the emitter may be made with as many bypasses as desired along a single labyrinth, and achieve substantially constant fluid flow over any desired range of fluid pressures. Further, in its preferred form, there is no restriction of the labyrinth, thereby preventing its becoming clogged. Any clogging that occurs in the channels when they are closed easily washes away when the pressure is reduced, such as when an irrigation system is turned off or on. Additionally, with no separate free-flow passage required to flush out the emitter, no increase in system power is required to operate large irrigation systems.

These and other features and advantages of the present invention will be apparent from the following detailed description of the preferred embodiments and associated drawings.

DETAILED DESCRIPTION OF THE PREFERRED EMBODIMENT

Figure 1:
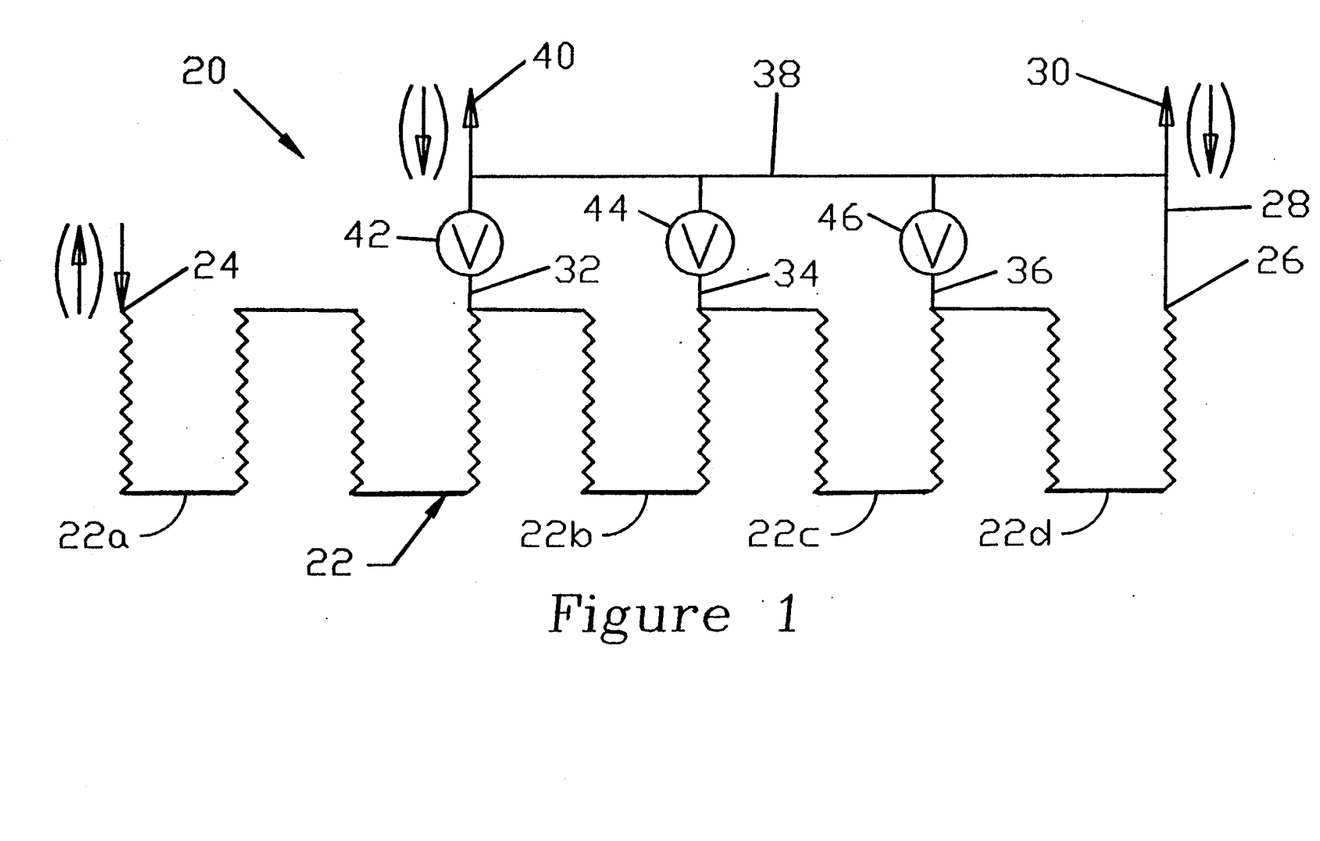
FIG. 1 is a general schematic of an emitter made according to the present invention.

Referring initially to FIG. 1, a general schematic of an emitter 20 made according to the preferred embodiment of the invention is shown. Emitter 20 has an extended fluid-turbulence passageway or labyrinth 22 having an inlet end 24, an outlet end 26, and respective sections 22a, 22b, 22c and 22d. The inlet end receives pressurized fluid from an irrigation pipe or conduit. The outlet end is coupled via an outlet line or chamber 28 to a low-pressure opening represented by arrow 30 to the exterior of the irrigation conduit in which, or attached to which, the emitter is operatively positioned. The labyrinth outlet end may also be directly connected to opening 30.

Relatively free-flow fluid control channels 32, 34 and 36 are distributed along and in communication with labyrinth 22. Channel 32 is closest to the inlet end, and channel 36 is closest to the outlet end, as shown. Each control channel is also in communication with opening 30 via a bypass channel 38. Bypass channel 38 is also preferably coupled to a second conduit opening 40.

Positioned at channels 32, 34 and 36 are valves 42, 44 and 46, respectively. Each of these is responsive to the fluid pressure at the inlet end of the labyrinth for selectively closing and opening the channels. At low fluid pressures, all of the valves are open. Fluid will primarily flow in the path of least resistance. This is the shortest labyrinth section 22a. As the pressure increases to a first predetermined value, valve 42 closes, preventing fluid flow in channel 32. This forces the fluid in the labyrinth to then flow through section 22b and out through channel 34.

As the fluid pressure in the conduit rises further to a second value, valve 44 closes, forcing the fluid to flow through an even longer labyrinth, represented by labyrinth sections 22a, 22b and 22c. When the fluid finally reaches a final pressure value, valve 46 also closes, requiring the fluid to flow through the entire, and therefore maximum, length of labyrinth 22. By choosing appropriate pressures for valve operation, a relatively constant flow is achieved.

The primary arrows shown on the fluid flow lines represent fluid flow direction as provided in the preferred embodiment described with reference to the remaining figures. As represented by the arrows in parentheses, the embodiment would function equally as well with fluid flow in the reverse direction.

The reference numbers applied in discussion of FIG. 1 are also applied to the embodiment of FIGS. 2-11, since they are functionally the same. Emitter 20 is preferably formed of an outer member, such as sleeve 50, which may be integral with an irrigation conduit 52. It may also be a member formed in or attached to a portion of a conduit and does not need to be a complete sleeve. Sleeve 50 has a plurality of openings, such as openings 30 and 40, discussed above, as well as openings 53 and 54 shown in FIGS. 2-4, and openings 55, 56, 57 and 58 shown in FIG. 5. These openings assure that the fluid pressure at the outputs of control channels 32, 34 and 36 are at atmospheric pressure. The function of the valves is then only dependent on the internal pressure of the fluid in the conduit.

Disposed within outer member 50 is an inner member formed as a generally tubular inner insert 60. As shown particularly in FIGS. 4-6, insert 60 has an inner surface 61 that defines, at least in part, an inner chamber 62 that preferably provides an uninterrupted continuation of the fluid flow inside conduit 52. A series of inlet openings shown generally at 64 provide communication between chamber 62 and inlet end 24 of labyrinth 22. Labyrinth section 22a, as particularly shown in FIG. 2, follows a serpentine path from inlet end 24 to an intermediate annular channel 66 that is in communication with control channel 32, as shown in FIG. 3.

Figure 2:
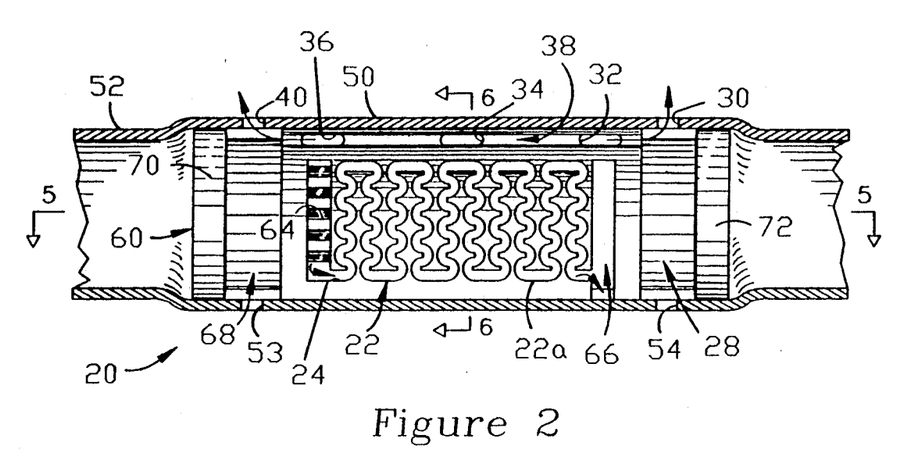
FIG. 2 is a partially cut away view of a longitudinal section of an emitter made according to the schematic of FIG. 1.
Figure 3:
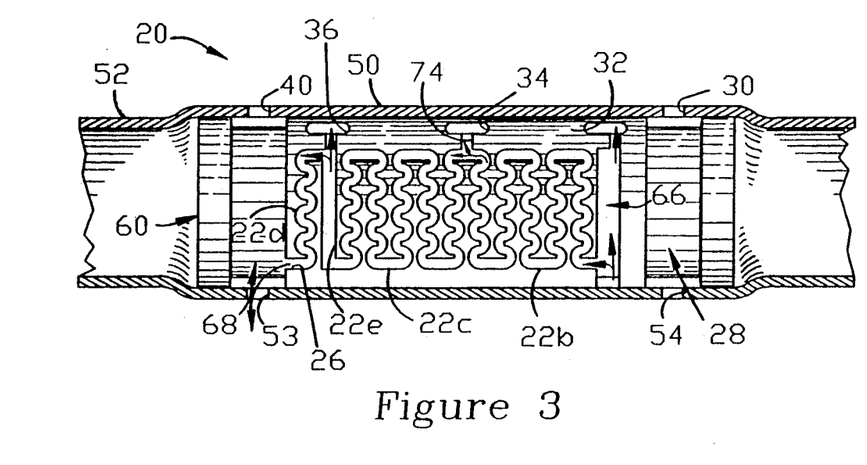
FIG. 3 is a partially cut away, mirror-image view of the reverse side of the emitter of FIG. 2.
Figure 4:
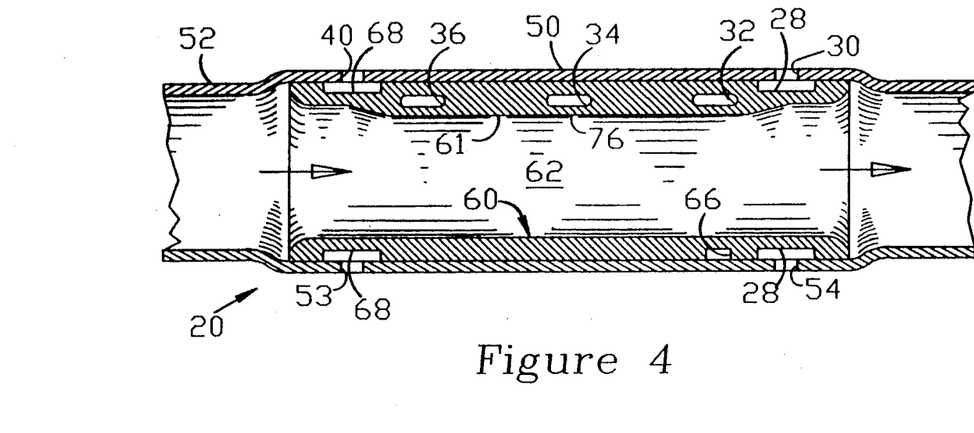
FIG. 4 is a cross section view of the emitter of FIG. 2 taken in the plane of that FIGURE.
Figure 5:
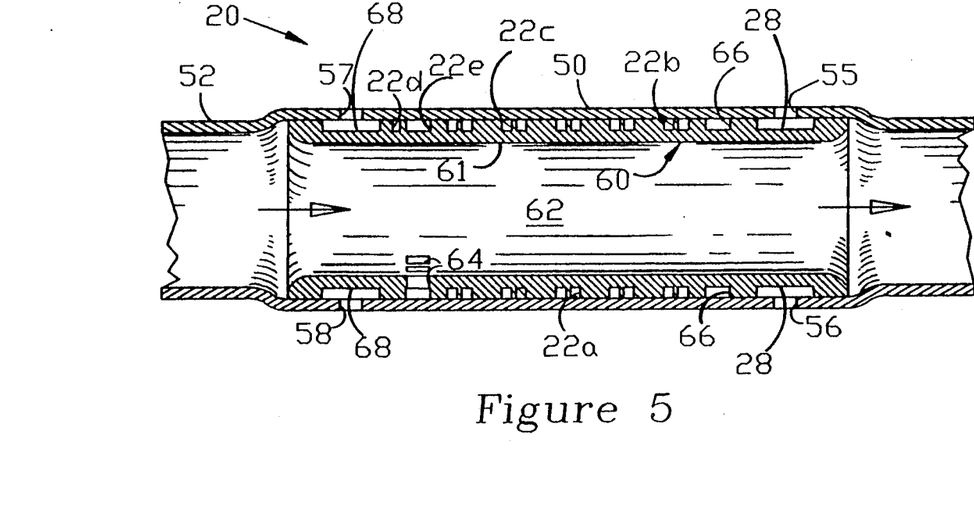
FIG. 5 is a cross section view taken along line 5—5 of FIG. 2, which view is orthogonal to the view of FIG. 4.

FIG. 3 is shown as a mirror image of the reverse side of insert 60 as shown in FIG. 2 in order to align the functional portions of the insert. That is, intermediate channel 66 is on the right in both figures as shown. Thus, the labyrinth extends from the inlet end on the left end of the insert in FIG. 2, to the right through section 22a until channel 66 is reached. The labyrinth then continues from the right at channel 66 in FIG. 3, through sections 22b, 22c and 22d, to outlet end 26 shown at the left. Thus, fluid flow through the labyrinth is readily visualized.

Open section 22e at the end of section 22c makes sections 22b and 22c effectively the same length, which results in essentially the same pressure drop in fluid passing through them. A second annular outlet chamber 68, substantially the same as outlet chamber 28, extends circumferentially around the left end of the insert, as shown in FIGS. 2-5. Shoulders 70 and 72 at the respective left and right ends of insert 60 seal the outlet chambers from the internal conduit fluid flow.

Figure 6:
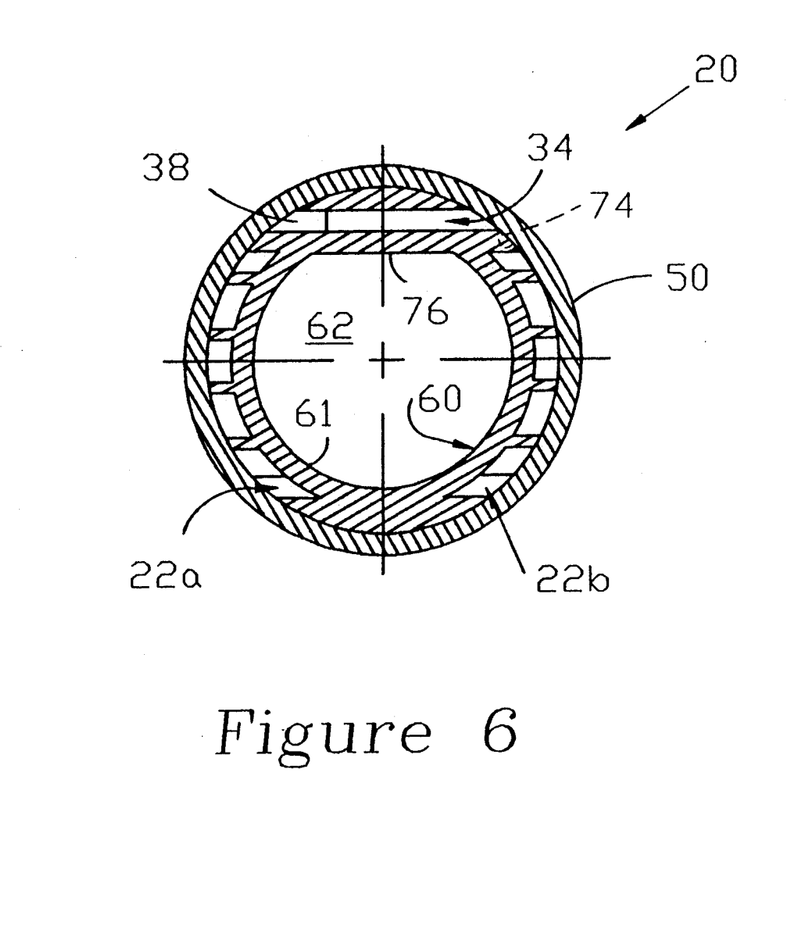
FIG. 6 is a cross section view taken along line 6—6 of FIG. 2.
Figure 7:
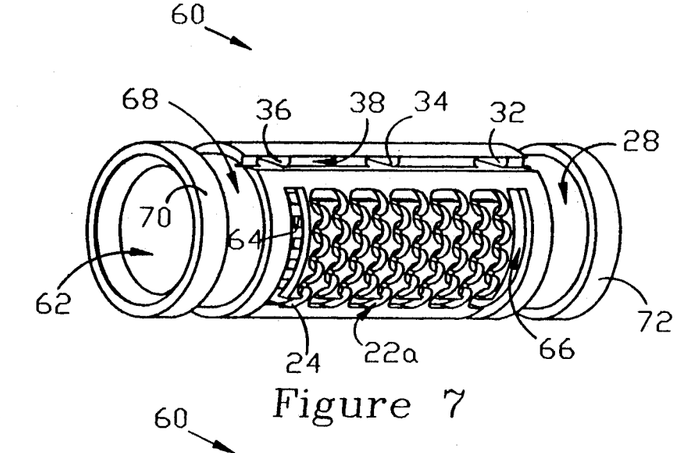
FIG. 7 is a perspective view of an insert portion of the emitter of FIG. 2.
Figure 8:
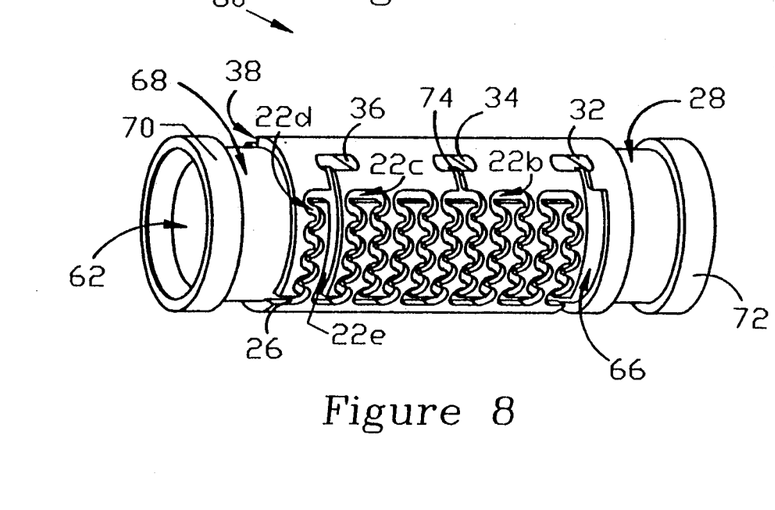
FIG. 8 is a rear, mirror-image perspective view of the insert of FIG. 7.

FIG. 6 shows insert 60 in cross section. Labyrinth section 22a is shown at the left and an end portion of section 22b is shown at the right of the FIGURE. A channel arm 74, shown in dashed lines, connects labyrinth section 22b to channel 34, shown along the top. A wall 76, formed integrally in insert 60, is disposed between inner chamber 62 and channel 34. Insert 60, in this embodiment is made of a synthetic resilient material, so wall 76 is a resilient web that is deformable under the pressure of fluid in the inner chamber to extend into channel 34. The wall therefore functions as a valve, as represented by valve 44 shown in FIG. 1.

Figure 11:
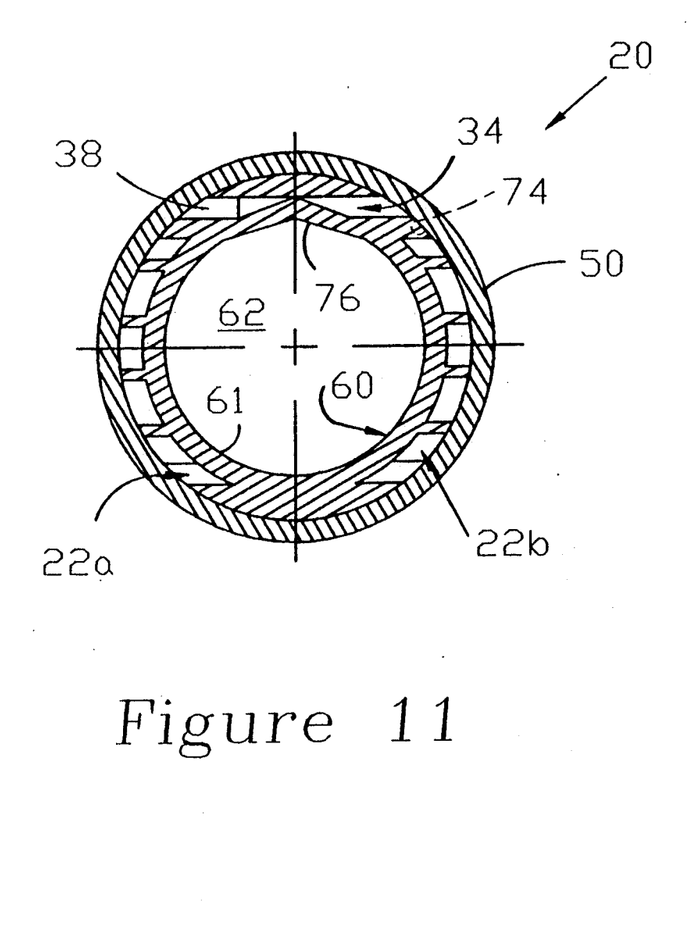
FIG. 11 is a view similar to FIG. 6 also illustrating operation under higher fluid-pressure conditions.
Figure 12:
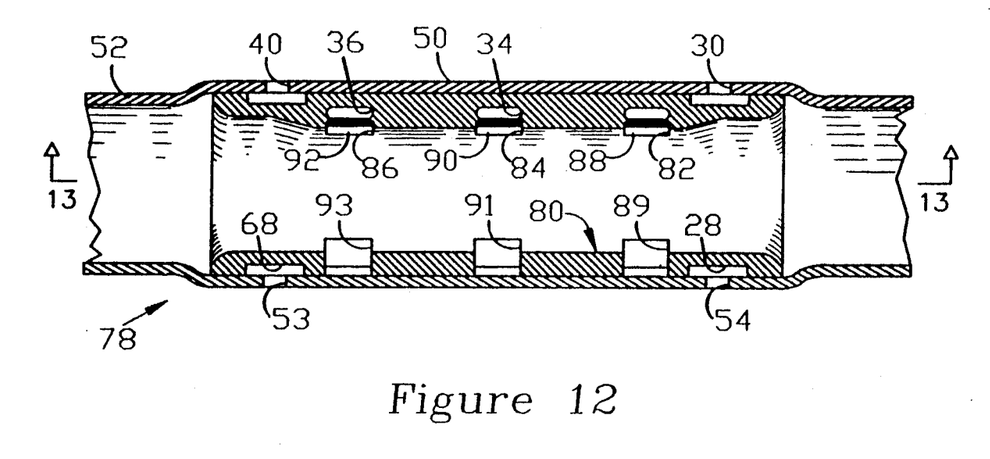
FIG. 12 is a view similar to FIG. 4 showing an alternative embodiment operating under low fluid-pressure conditions.
Figure 13:
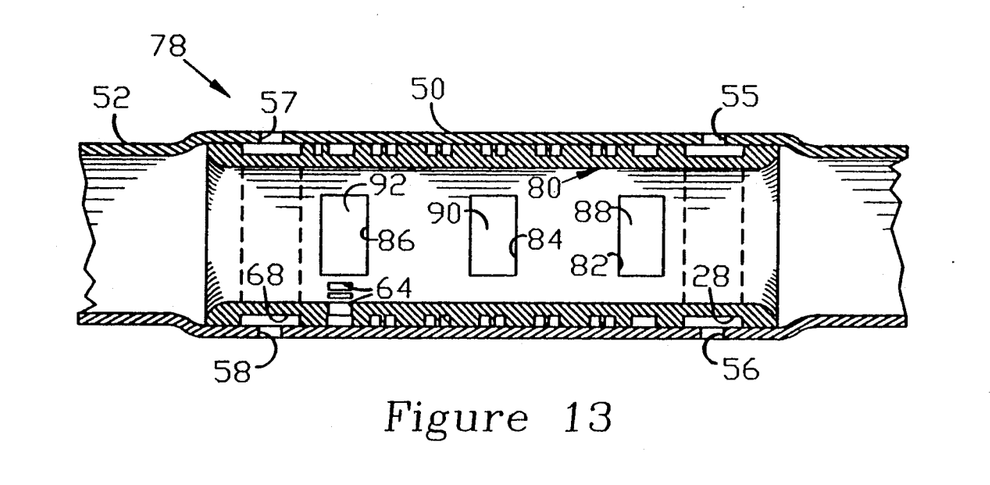
FIG. 13 is a view similar to FIG. 5 of the embodiment of FIG. 12.

Each of channels 32 and 36 also have walls similar to wall 76. By making these walls progressively thicker, from channel 32 to 36, or by making the width of the channels progressively narrower, the pressure required to deform the walls sufficiently to close the channels, as shown in FIG. 11, increases with each channel along the labyrinth. The operation of emitter 20 is therefore as was described with reference to the schematic of FIG. 1.

Figure 9:
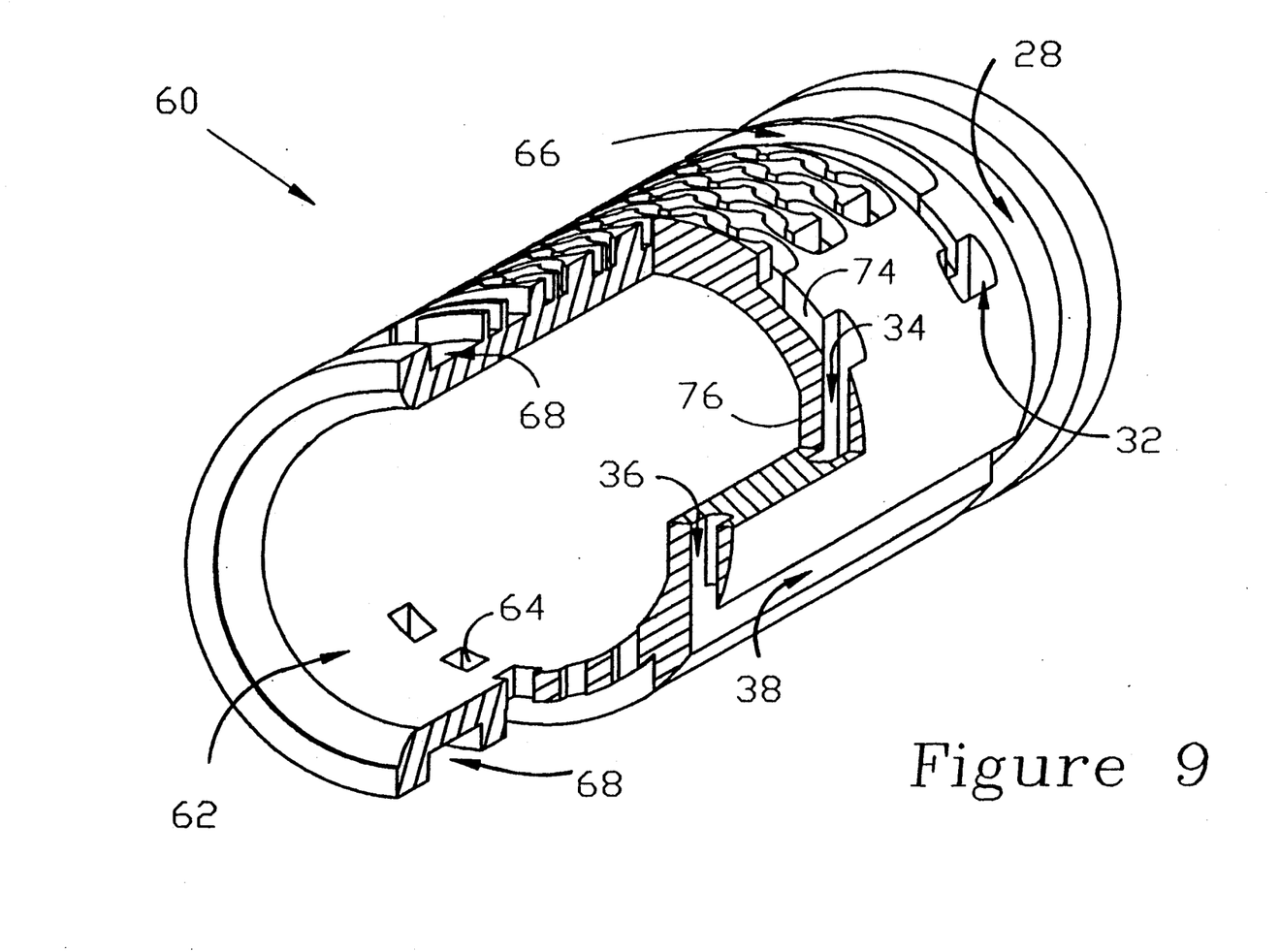
FIG. 9 is a partial fragmentary perspective view (not to scale) of the insert of FIG. 7 illustrating operation under low fluid-pressure conditions.
Figure 10:
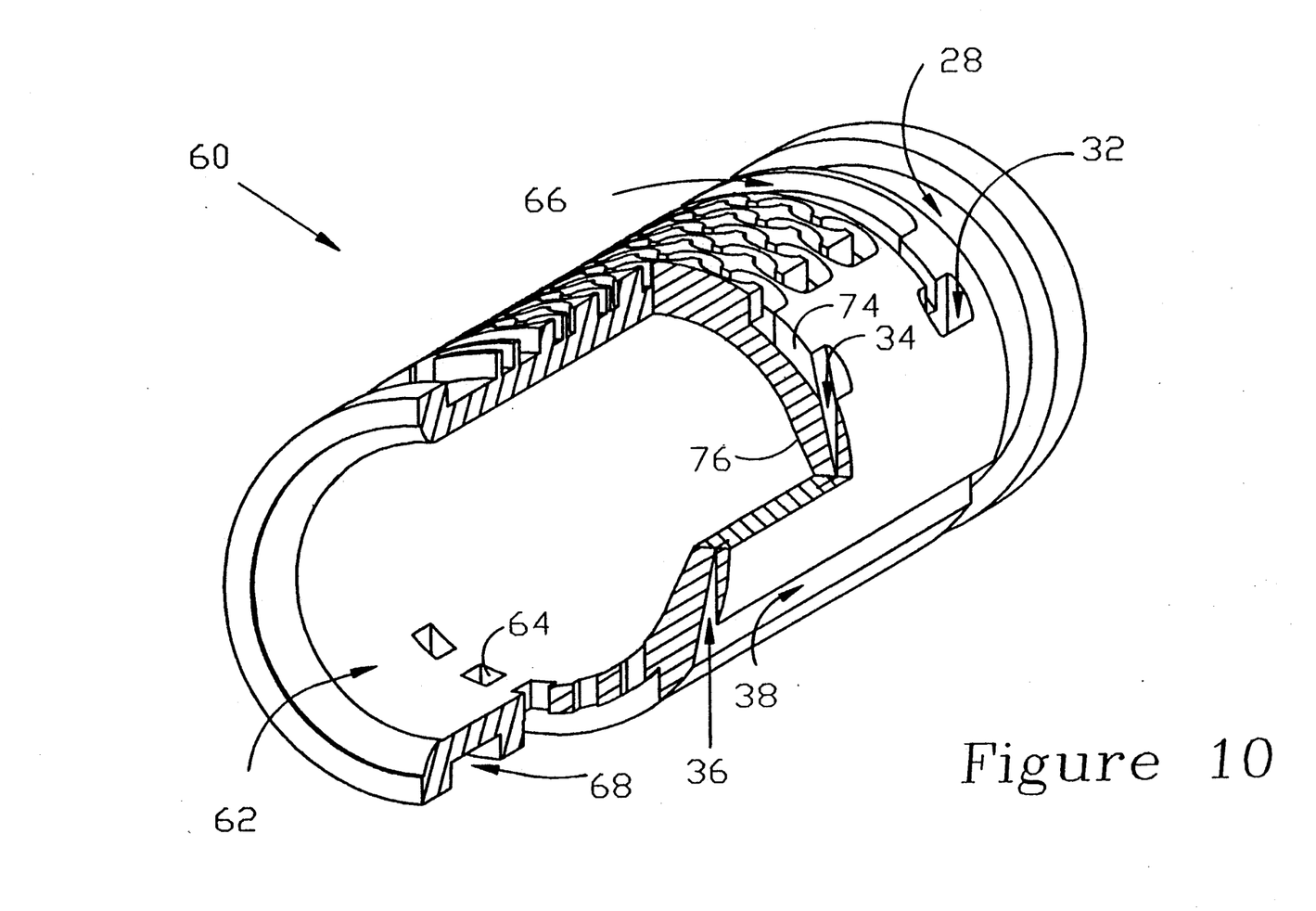
FIG. 10 is view similar to FIG. 9 illustrating operation under higher fluid-pressure conditions.

This is illustrated in FIGS. 9-11. FIGS. 9 and 10 are partial fragmentary perspective views (not to scale) of insert 60. Control channels 34 and 36 are shown in partial cross section. In FIG. 9, these channels are open, such as would be the case when the conduit fluid pressure is low. FIG. 10 illustrates the control channels in a closed condition or state, as they would be under higher conduit fluid pressure conditions. FIG. 11 also shows channel 34 in a closed condition. When the fluid pressure in the conduit is high enough to close all of the control channels, the fluid is forced to travel the length of the entire labyrinth.

The controlled rate of flow through emitter 20 is directly related to:
a) the length, size, shape of labyrinth sections;
b) the size and length of the control channels;
c) the number of valved bypass channels positioned along the labyrinth; and
d) the flexibility of the resilient material forming wall 76 and the other walls.

These factors may be manipulated to produce an emitter having a desired flow rate.

There are many ways that the preferred embodiment just described could be varied. One such emitter 78 is illustrated in FIGS. 12-15. In this emitter, an insert 80 mounted in a conduit 52 has fluid passageways the same as emitter 20, which passageways are given the same reference numbers to simplify discussions. The control channels 32, 34 and 36 are the same in shape. However, tapered apertures 82, 84 and 86, respectively, exist between the channels and inner chamber 62, as particularly shown in FIGS. 14 and 15. Each of the apertures has inserted in it a conformably shaped flexible membrane 88, 90 or 92. These membranes are structured to deform at predetermined pressures, as was the case for the walls associated with insert 60. With separate membranes forming the channel valves, insert 80 may be made of a rigid thermoplastic material.

Figure 14:
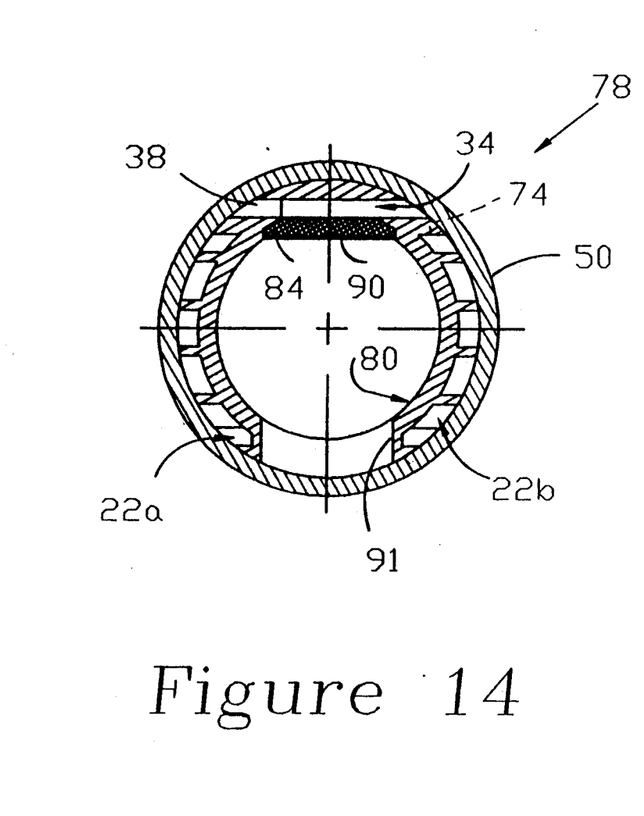
FIG. 14 is a view similar to FIG. 6 of the embodiment of FIG. 12.
Figure 15:
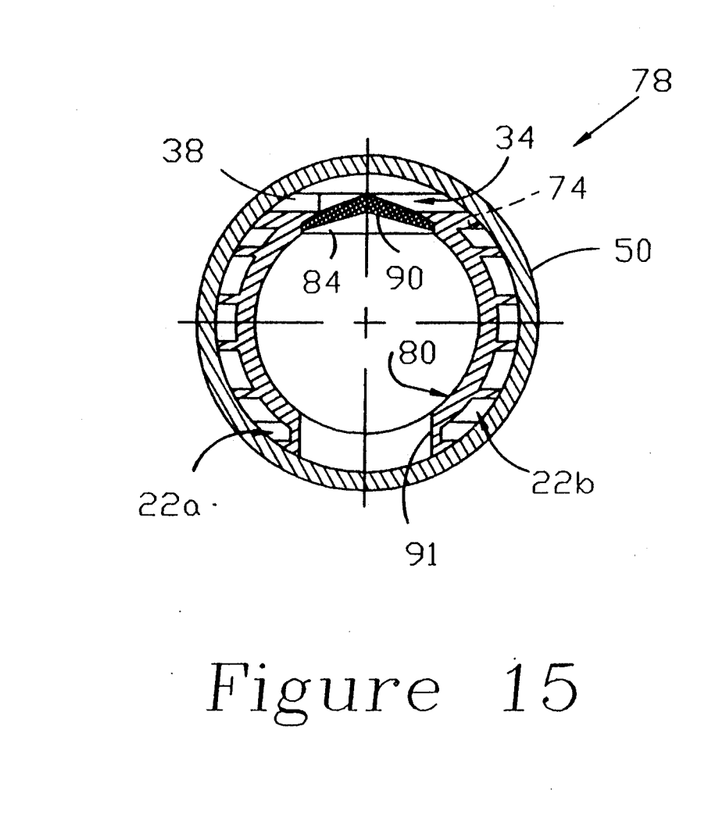
FIG. 15 is a view similar to FIG. 11 of the embodiment of FIG. 12 operating under higher fluid-pressure conditions.

Opposite from each of tapered apertures 88, 90 and 92 are corresponding access apertures 89, 91 and 93, respectively. These apertures are required during manufacture of insert 80 to provide access to the tapered apertures, and do not affect the functionality of the emitter.

The flexibility of membranes 88, 90 and 92 and the shapes of apertures 82, 84 and 86 are used to determine the pressures at which the associated control channels will close. By proper coordination of these and other mentioned parameters, a substantially constant flow condition is feasible.

In order to avoid unnecessary clogging, it is preferable that the membranes be structured in a way that results in the rapid closing of the associated control channels. One way that this can be done is to form the membrane with a slight curvature (not shown) into the inner chamber. When the requisite pressure is reached, the membrane will snap into the channel, blocking the fluid flow therein. Other designs may also be used.

Figure 16:
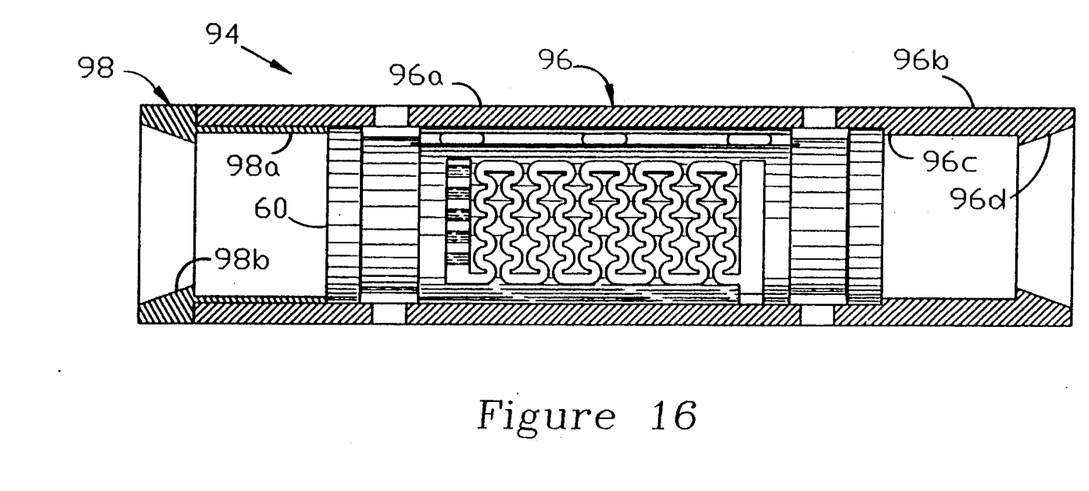
FIG. 16 is a view similar to FIG. 2 showing a third embodiment of the invention.
Figure 17:
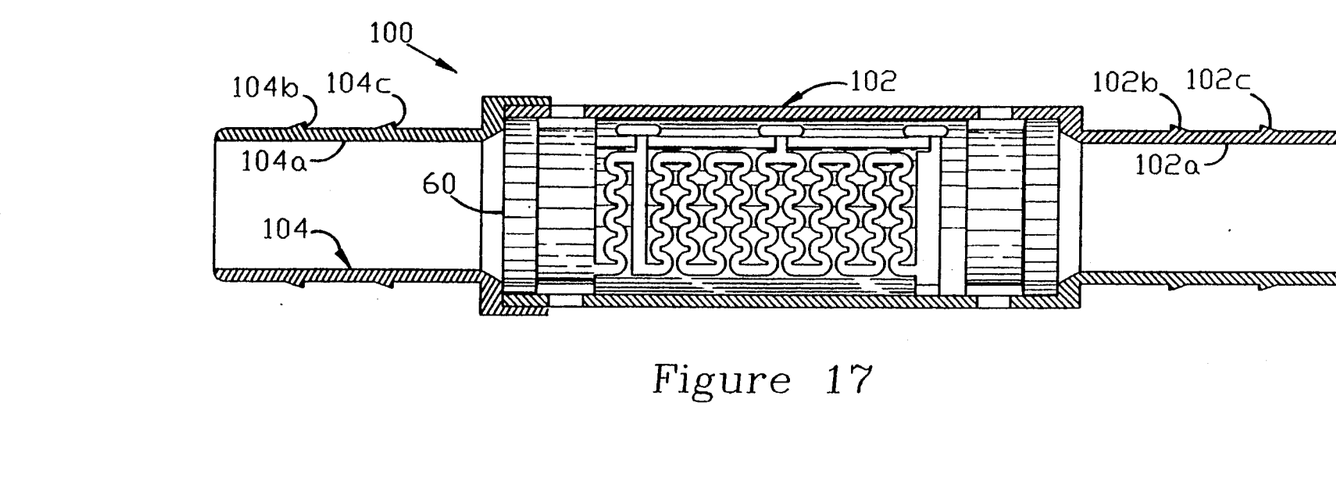
FIG. 17 is a view similar to FIG. 3 showing a fourth embodiment of the invention.

FIGS. 16 and 17 show two other ways that inserts 60 or 80 could be mounted in an outer sleeve to form an emitter. FIG. 16 shows an emitter 94 in which the insert is mounted in an outer sleeve 96 having a first section 96a sized to receive snugly insert 60 and a second section 96b sized slightly less than the outer diameter of the insert, in order to form a shoulder 96c that limits the travel of the insert. A cap member 98 has a tubular extension 98a with an outer diameter conforming to that of section 96a, and an inner diameter conforming generally to that of section 96b. When fixedly mounted in section 96a, as shown, cap member 98 captures the insert in sleeve 96.

The distal ends of sleeve 96 and cap member 98 have inwardly tapered openings with ridges 96d and 98b that grasp the mating ends of an irrigation pipe conduit in which the emitter is positioned.

FIG. 17 shows an emitter 100, similar to emitter 94, in which insert 60 is mounted in an outer sleeve 102, and is held there by a cap member 104, as shown. In this embodiment, the ends 102a and 104a of the sleeve and cap member, respectively, are formed with a reduced diameter and exterior ridges, such as ridges 102b and 102c, and 104b and 104c. These ends are matingly and sealingly received in associated ends of irrigation conduit.

It will also be understood that an embodiment similar to those of FIGS. 16 and 17 could be made in which one end of the insert is sealed to prevent fluid flowing through the inner chamber, with the opposite end of the fluid chamber connected to a separate uninterrupted irrigation conduit through a tube extending into the conduit. Such an emitter can be used as an attachment to the conduit, rather than being built into it, as is the case of emitter 20, or rather than being inserted between adjacent ends of conduit, as is the case with emitters 94 and 100. As has been mentioned, the invention could be formed of non-tubular members attached along a portion of a conduit wall.

It will therefore be apparent to one skilled in the art that many variations in form and detail may be made in the preferred embodiment without varying from the spirit and scope of the invention as defined in the claims. The preferred embodiment is thus provided for purposes of explanation and illustration, but not limitation.

I claim:

1. A drip irrigation emitter operatively installed in an irrigation pipe having an interior containing pressurized fluid and an exterior exposed to ambient conditions, the interior communicating with the exterior via at least one outlet opening in the pipe, the drip irrigation emitter comprising:

means defining a flow-limiting fluid passageway having an inlet end for receiving the pressurized fluid from the pipe and an outlet end for emitting fluid from the passageway for communicating the interior of the pipe to said at least one outlet opening in the pipe, the flow-limiting fluid passageway having a maximum fluid-flow path length;

channel means coupled to an intermediate portion of the passageway located between the inlet end and the outlet end, for transmitting fluid between the intermediate portion of the passageway and one of the pipe interior and said at least one outlet opening in the pipe; and valve means coupled to the channel means, and operable in a fluid-flow restricting state and in a fluid-flow nonrestricting state, and being responsive to the fluid pressure inside the pipe for operating in one of the operating states when the pressure inside the pipe is less than a predetermined pressure and for operating in the other of the operating states when the pressure inside the pipe is more than the predetermined pressure, whereby the length of the shortest path of fluid flowing through the passageway to said at least one outlet opening is less than the maximum length when the valve means is operating in the nonrestricting state.

2. A drip irrigation emitter operatively installed in an irrigation pipe having an interior containing pressurized fluid and said at least one exterior exposed to ambient conditions, the interior communicating with the exterior via at least one outlet opening in the pipe, the drip irrigation emitter comprising:

means defining a flow-limiting fluid passageway having an inlet end for receiving the pressurized fluid from the pipe interior and a first outlet end in communication with said at least one outlet opening in the pipe for emitting fluid from the passageway;

first channel means coupled to a first intermediate portion of the passageway, located between the inlet end and the outlet end, for transmitting fluid between the first intermediate portion of the passageway and one of the pipe interior and said at least one outlet opening in the pipe; and first valve means associated with and disposed in the first channel means, and responsive to the pressure of the fluid in the pipe interior for restricting the first channel means when the pressure of the fluid in the pipe exceeds a first predetermined pressure and for opening the channel means when the pressure in the pipe does not exceed the first predetermined pressure to allow the fluid to bypass the portion of the flow-limiting fluid passageway downstream of the channel means.

3. An emitter according to claim 2 further comprising a second channel means associated with and coupled to a second intermediate portion of the passageway for transmitting fluid between the passageway and one of the pipe interior and an outlet opening in the pipe, and a second valve means for restricting the second channel means when a second predetermined fluid pressure different than the first predetermined pressure is reached.

4. An emitter according to claim 3 wherein the second channel means is located between the first outlet end and the first portion of the passageway, and the second predetermined pressure is greater than the first predetermined pressure.

5. An emitter according to claim 3 wherein each of the valve means comprises a wall exposed on one side to the fluid in the pipe and on the other side to the associated channel means, the wall being deformable for collapsing into the channel means when the respective predetermined pressure is reached.

6. An emitter according to claim 2 wherein the valve means comprises a wall exposed on one side to the fluid in the pipe and on the other side to the channel means, the wall being deformable for collapsing into the channel means when the predetermined pressure is reached.

7. A drip irrigation emitter, for use with an irrigation pipe containing pressurized fluid, comprising:

an outer member having an outer surface, an inner surface, and at least one opening extending between the inner and outer surfaces;

an inner member fixedly positioned adjacent to the inner surface of the outer member over the opening, the inner member defining an inner chamber for receiving the pipe fluid;

the inner member and the outer member defining, in combination:

a flow-limiting fluid passageway having an effective cross-sectional area, an inlet end in communication with the inner chamber for receiving the pressurized fluid from the pipe and an outlet end in communication with the outer-member opening for emitting the fluid from the passageway;

a channel coupled to a first intermediate portion of the passageway located between the inlet end and the outlet end, for transmitting fluid from the first intermediate portion of the passageway toward said at least one outer member opening; and a resilient wall forming a barrier between the channel and the inner chamber, the wall being responsive to the pressure in the inner chamber for restricting the channel when the pressure exceeds a first predetermined pressure and for opening the channel when the pressure in the inner chamber does not exceed the first predetermined pressure to allow the fluid to bypass the portion of the flow-limiting fluid passageway downstream of the channel.

8. An emitter according to claim 7 wherein the wall is integral with the inner member.

9. An emitter according to claim 7 wherein the inner member includes an aperture extending between the inner chamber and the channel, and the wall comprises a resilient web closing the aperture.

10. A drip irrigation emitter insert for use in an irrigation pipe, the pipe having an interior that contains pressurized fluid flowing along a fluid path, an exterior, and at least one opening communicating the interior with the exterior of the pipe, the insert being constructed to be fixedly positioned inside and in intimate contact with the pipe for separating the opening from the fluid path, and the insert defining an inner chamber for receiving fluid from the pipe, the insert, when fixed in the pipe, comprising:

a flow-limiting fluid passageway having an effective cross-sectional area with an inlet end in communication with the inner chamber for receiving the pressurized fluid from the pipe and an outlet end in communication with the at least one opening for emitting the fluid from the passageway;

a channel coupled to a first intermediate portion of the passageway located between the inlet end and the outlet end, for transmitting fluid from the first intermediate portion of the passageway toward the at least one pipe opening; and a resilient wall forming a barrier between the channel and the inner chamber, the wall being responsive to the pressure in the inner chamber for restricting the channel when the pressure exceeds a first predetermined pressure and for opening the channel when the pressure in the inner chamber does not exceed the first predetermined pressure to allow the fluid to bypass the portion of the flow-limiting fluid passageway downstream of the channel.

11. An insert according to claim 10 wherein the wall is integral with the insert.

12. An insert according to claim 10 wherein the insert includes an aperture extending between the inner chamber and the channel, and the wall comprises a resilient web closing the aperture.

* * * * *